US008374739B2

(12) United States Patent
Yamamoto et al.

(10) Patent No.: US 8,374,739 B2
(45) Date of Patent: Feb. 12, 2013

(54) TRAIN CONTROL DEVICE HAVING A TARGET SPEED CALCULATION FUNCTION

(75) Inventors: Junko Yamamoto, Kanagawa-ken (JP); Michio Kanayama, Tokyo (JP); Kenji Yoshida, Tokyo (JP); Yasuhiro Terakado, Tokyo (JP)

(73) Assignee: Toshiba Corporation, Tokyo (JP)

( * ) Notice: Subject to any disclaimer, the term of this patent is extended or adjusted under 35 U.S.C. 154(b) by 0 days.

(21) Appl. No.: 13/493,503

(22) Filed: Jun. 11, 2012

(65) Prior Publication Data

US 2012/0245770 A1 Sep. 27, 2012

Related U.S. Application Data

(63) Continuation of application No. PCT/JP2011/058180, filed on Mar. 31, 2011.

(30) Foreign Application Priority Data

Apr. 1, 2010 (JP) ............................... P2010-085247

(51) Int. Cl.
*G05D 1/00* (2006.01)

(52) U.S. Cl. ......................... 701/20; 701/19; 246/182 C

(58) Field of Classification Search .................... 701/19, 701/20; 246/182 R, 182 A, 182 C
See application file for complete search history.

(56) References Cited

U.S. PATENT DOCUMENTS 6,095,618 A * 8/2000 Heneka et al. .................... 303/3
7,092,801 B2 * 8/2006 Kane et al. ...................... 701/19
7,715,956 B2 * 5/2010 Bryant ........................... 701/19
8,140,202 B2 * 3/2012 Dibble et al. .................. 701/20
2003/0120400 A1 * 6/2003 Ahmed Baig et al. .......... 701/19
2007/0219681 A1 * 9/2007 Kumar et al. .................. 701/19
2008/0154451 A1 * 6/2008 Dibble et al. .................. 701/20

FOREIGN PATENT DOCUMENTS

JP 05193502 8/1993
JP 2004-266986 9/2004

* cited by examiner

*Primary Examiner* — Helal A Algahaim
(74) *Attorney, Agent, or Firm* — Baker Botts L.L.P.

(57) ABSTRACT

A train control device includes a first acquisition unit for acquiring a change history of open block numbers as the number of blocks existing between a present train and a leading train, a setting unit for setting a brake pattern having a starting point coinciding with an end point of a block existing just behind a block occupied by the leading train, and a calculating unit for calculating a time taken for the leading train to come out from the block existing just behind the block occupied by the leading train and for calculating, as a target speed, the highest speed available within a range not conflicting with the brake pattern.

13 Claims, 12 Drawing Sheets

TRAIN CONTROL DEVICE HAVING A TARGET SPEED CALCULATION FUNCTION

CROSS-REFERENCE TO RELATED APPLICATIONS

This application is a continuation of, based upon, and claims the benefit of priority from International Application No. PCT/JP2011/058180, filed on Mar. 31, 2011, which is a continuation of Japanese Patent Application No. P2010-085247, the entire contents of which are incorporated herein by reference.

TECHNICAL FIELD

The present disclosure relates to a technique of adaptively adjusting a travel plan of a train to make sure that the train can travel as scheduled.

BACKGROUND

In recent years, an automatic train operation device (ATO) has been proposed with a view to assure the uniform interval travel of a motor vehicle such as a train and to reduce the likelihood of delayed travel. For example, the ATO controls the operation of a train based on the travel plan calculated pursuant to data such as route data or vehicle model data.

A train is equipped with an automatic train control device (ATC) as a security device. The automatic train control device applies brake if the travel speed of a train exceeds a specified speed or if the distance between a leading train and a trailing train becomes too close.

Nowadays, techniques for seeking energy saving and riding comfort are developed on the premise of as-scheduled travel. JP2004-266986A discloses a configuration in which the travel conditions of a trailing train such as coasting and acceleration are controlled pursuant to the timing at which a leading train moves from a current block to the next block and the timing at which a trailing train is predicted to arrive when accelerated with a brake pattern reflecting the existence of a leading train.

JP H5-193502A discloses a configuration in which the travel pattern of a train to observe a specified travel distance and a specified speed limit is calculated using a reverse curve, a notch switching reference parameter and an upper limit speed.

A trailing train repeats acceleration and deceleration if it comes close to a leading train due to schedule disarray or other causes. Thus, the riding comfort grows worse. In JP2004-266986A, the trailing train coasts if it is likely to reach a limited speed pattern through acceleration. Although the trailing train can maintain good riding comfort by performing a coasting operation and avoiding reaching a brake pattern, it does not take into account the running time delay caused by the coasting operation. This may possibly impair punctuality. For the above reason, it is necessary for the trailing train to take, as its target speed, the highest speed achievable without reaching the brake pattern, thereby preventing the riding comfort from getting worse, keeping the running time delay smallest and minimizing the influence on the succeeding trailing trains.

The configuration disclosed in JP H5-193502A is directed to a short inter-station railroad. The task of calculating a travel plan based on geographical conditions, such as gradient, requires a vast amount of time and processing load. Therefore, the configuration disclosed in JP5-193502A is not suitable for use in a high-speed railroad having an increased inter-station distance and requiring a long-time travel plan.

In the configurations disclosed in JP2004-266986A and JP H5-193502A, the train operation is largely dependent upon the driver's driving technique. The variations in the driving technique affect energy saving, riding comfort and schedule disarray.

SUMMARY

It is an object of the present disclosure to provide a train control device capable of adaptively calculating the target speed of a train on the condition of as-scheduled travel.

A train control device according to one embodiment includes a first acquisition means for acquiring a change history of open block numbers as the number of blocks existing between a present train and a leading train, a setting means for setting a brake pattern at the rear side of the leading train, and a calculating means for, based on the change history, calculating a time taken for the leading train to come out from a block occupied by the leading train and for calculating a target speed at which the present train does not conflict with the brake pattern.

A train control device according to another embodiment includes a setting means for setting a travel plan to the next station, a calculating means for calculating a travel time from a current position to the next station based on the travel plan, and an adjusting means for adjusting the travel time of the travel plan by comparing the travel time with a predetermined time.

DETAILED DESCRIPTION

Figure 1:
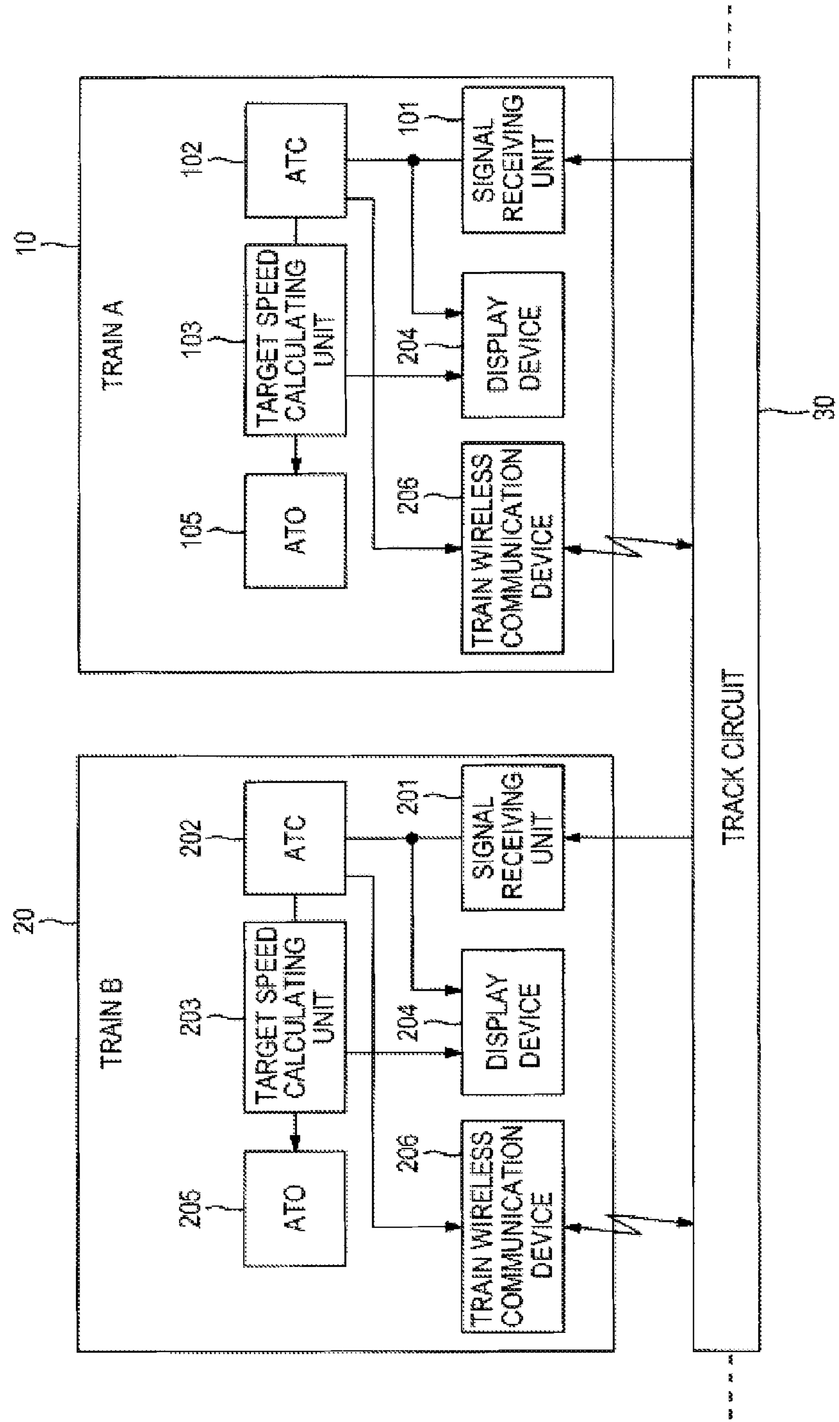
FIG. 1 is a block diagram showing a system including a plurality of trains each provided with a train control device according to a first embodiment and a track circuit.

Embodiments of the present disclosure will now be described with reference to the accompanying drawings. FIG. 1 is a block diagram showing a system including a plurality of trains each provided with a train control device according to a first embodiment and a track circuit. The first embodiment is directed to a system for a long-distance high-speed railroad. A train A10 includes a signal receiving unit 101, an automatic train control device (ATC) 102, a target speed calculating unit 103, a display device 104, an automatic train operation device (ATO) 105 and a train wireless communication device 106. A train control device referred to herein includes the ATC 102, the target speed calculating unit 103 and the ATO 105.

The signal receiving unit 101 acquires various kinds of information through a track circuit 30 as a ground system. Through the track circuit 30, the signal receiving unit 101 acquires information on the number of open blocks between a present train and a leading train running ahead of the present train. The information on the number of open blocks indicates the number of blocks existing between a block in which the leading train runs and a block in which the present train runs. The signal receiving unit 101 acquires from the track circuit 30 an ID indicating the block in which the present train runs. The ID is allotted to each of the blocks. The ATC 102 performs automatic brake control with respect to the train A10. The ATC 102 acquires the open block number information received by the signal receiving unit 101. In each control cycle, the ATC 102 acquires the open block number through the signal receiving unit 101. Description made herein is directed to a case where the ATC 102 is a digital ATC. This is because an analog ATC has a reduced ability to acquire information and cannot acquire the open block number information.

The target speed calculating unit 103 receives the open block number information from the ATC 102, holds the change history of the open block number and calculates a target speed of the train A10 based on the open block number information. In addition, the target speed calculating unit 103 calculates a travel plan to the next station. The display device 104 displays various kinds of information on a display in response to the request of the target speed calculating unit 103. The ATO 105 automatically operates the train A10 pursuant to the travel plan calculated by the target speed calculating unit 103. The train wireless communication device 106 transmits and receives information between trains through a network of the ground system (not shown).

The train B20 is a trailing train that runs after the train A10. The train B20 includes a signal receiving unit 201, an ATC 202, a target speed calculating unit 203, a display device 204, an ATO 205 and a train wireless communication device 206. The configurations of the signal receiving unit 201, the ATC 202, the target speed calculating unit 203, the display device 204, the ATO 205 and the train wireless communication device 206 are the same as the configurations of the signal receiving unit 101, the ATC 102, the target speed calculating unit 103, the display device 104, the ATO 105 and the train wireless communication device 106. The track circuit 30 transmits formation on the number of open blocks existing between the present train and the leading train to the trailing train. Each of the blocks is allotted with a specific ID.

Next, description will be made on a case where the target speed of the train B20 as a trailing train is adjusted depending on the travel speed of the train A10 as a leading train. The train A10 and the train B20 performs a power running operation, a constant speed running operation, a coasting operation and a decelerating operation when traveling along one block from start to stop.

First, the target speed calculating unit 203 sets a brake pattern having a starting point coinciding with the end point of the block existing just behind the block currently occupied by the train A10. The brake pattern is a curve that correlates the travel speed of the train B20 with the brake applying position where brake is applied by the ATC 202. The brake pattern is positioned at the front side of the starting point as the speed becomes greater. If the train B20 conflicts with the brake pattern, the ATC 202 applies brake so that the train B20 should not enter the block currently occupied by the leading train A10. Next, the target speed calculating unit 203 calculates, in the following manner, the travel speed (average travel speed) of the train B20 in the block passed by the leading train A10 (the block existing just behind the block occupied by the leading train A10).

The target speed calculating unit 203 holds the block length information on the length of the respective blocks. Thus, the target speed calculating unit 103 calculates the travel speed of the train B20 in the block passed by the train A10, using the block length information of the block passed by the train A10 and the change history of the open block number, namely the increasing time interval of the open blocks.

Next, the target speed calculating unit 203 calculates, in the following manner, the time at which the train A10 is predicted to come out from the currently running block. Using the travel speed of the train A10 in the block passed by the leading train A10 and the block length information of the block currently occupied by the train A10, the target speed calculating unit 203 calculates the time at which the train A10 is predicted to come out from the currently running block. In other words, the target speed calculating unit 203 predicts the timing at which the brake pattern having a starting point coinciding with the end point of the block existing just behind the block currently occupied by the train A10 is shifted to a brake pattern having a starting point coinciding with the end point of the block existing just ahead of the block currently occupied by the train A10.

Then, the target speed calculating unit 203 calculates, in the following manner, the travel speed of the train B20 at which the train B20 is allowed to travel to the position where the train B20 is immediately before conflicting with the brake pattern, when the brake pattern having a starting point coinciding with the end point of the block existing just behind the block currently occupied by the train A10 is shifted to a brake pattern having a starting point coinciding with the end point of the block existing just ahead of the block currently occupied by the train A10. The target speed calculating unit 203 calculates the distance to the position where the train B20 is immediately before conflicting with the brake pattern, using the current position of the train B20 found from the ID of the block currently occupied by the train B20. At this time, the ID of the block is acquired from the track circuit 30. The target speed calculating unit 203 determines that the time taken for the train A10 to come out from the currently running block is equal to the time taken for the train B20 to travel to the position where the train B20 is immediately before conflicting with the brake pattern. Accordingly, the target speed calculating unit 203 can calculate the travel speed of the train B20, i.e., the target speed, using the distance to the position where the train B20 is immediately before conflicting with the brake pattern and the travel time to the position where the train B20 is immediately before conflicting with the brake pattern.

In case of an automatic operation, the target speed calculating unit 203 transmits the calculated target speed to the ATO 205. The ATO 205 automatically operates the train B20 by controlling the travel speed of the train B20 pursuant to the target speed. In case of a manual operation, the target speed calculating unit 203 transmits the target speed information to the display device 204. The display device 204 displays the target speed on a display (not shown). Based on the target speed displayed on the display device 204, the driver operates a master controller (not shown) and manually drives the train B20 at a controlled travel speed.

Figure 2A:
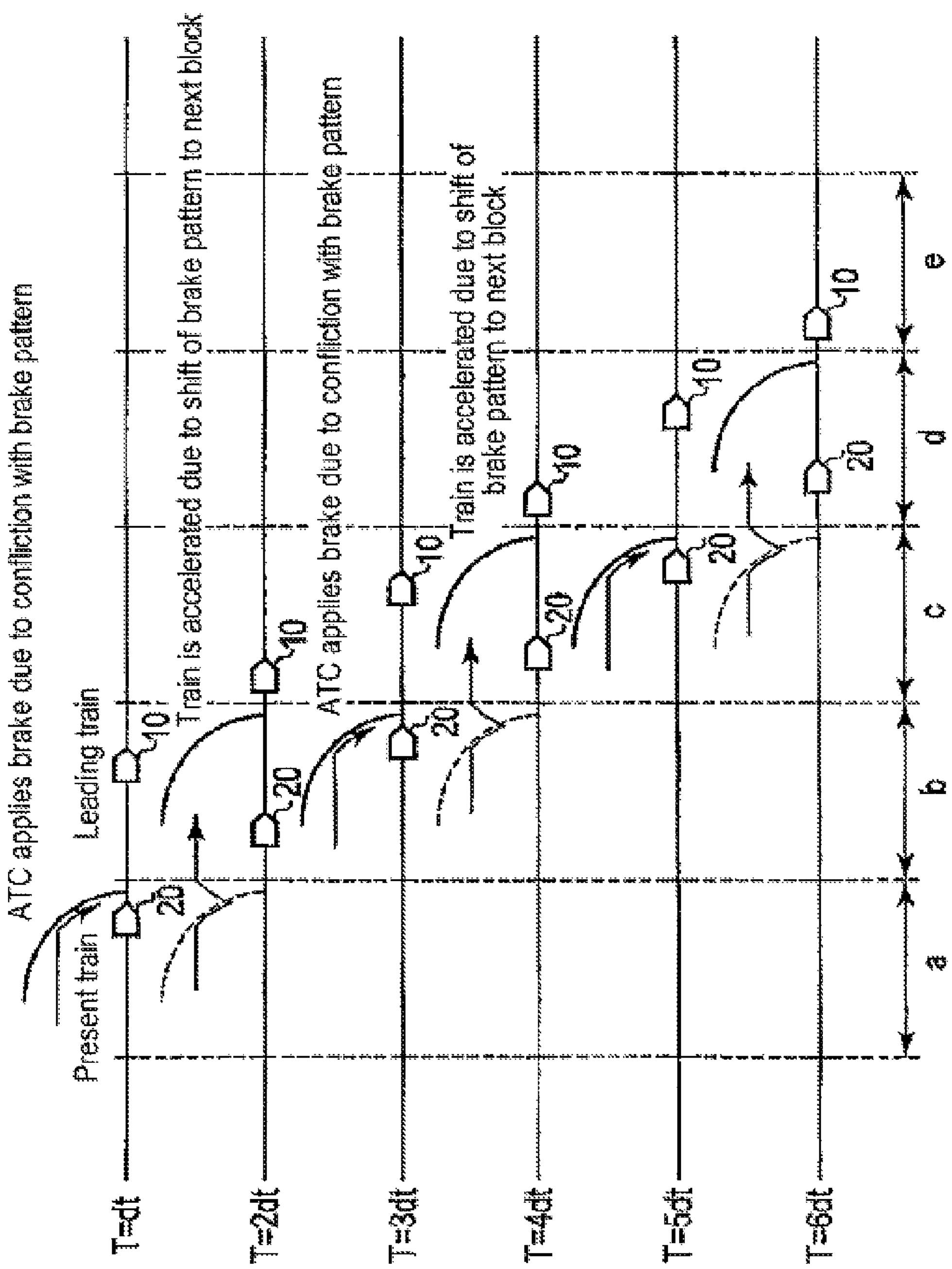
FIG. 2A is a view for explaining the shift of a brake pattern and the adjustment of a travel speed according to the first embodiment.
Figure 2B:
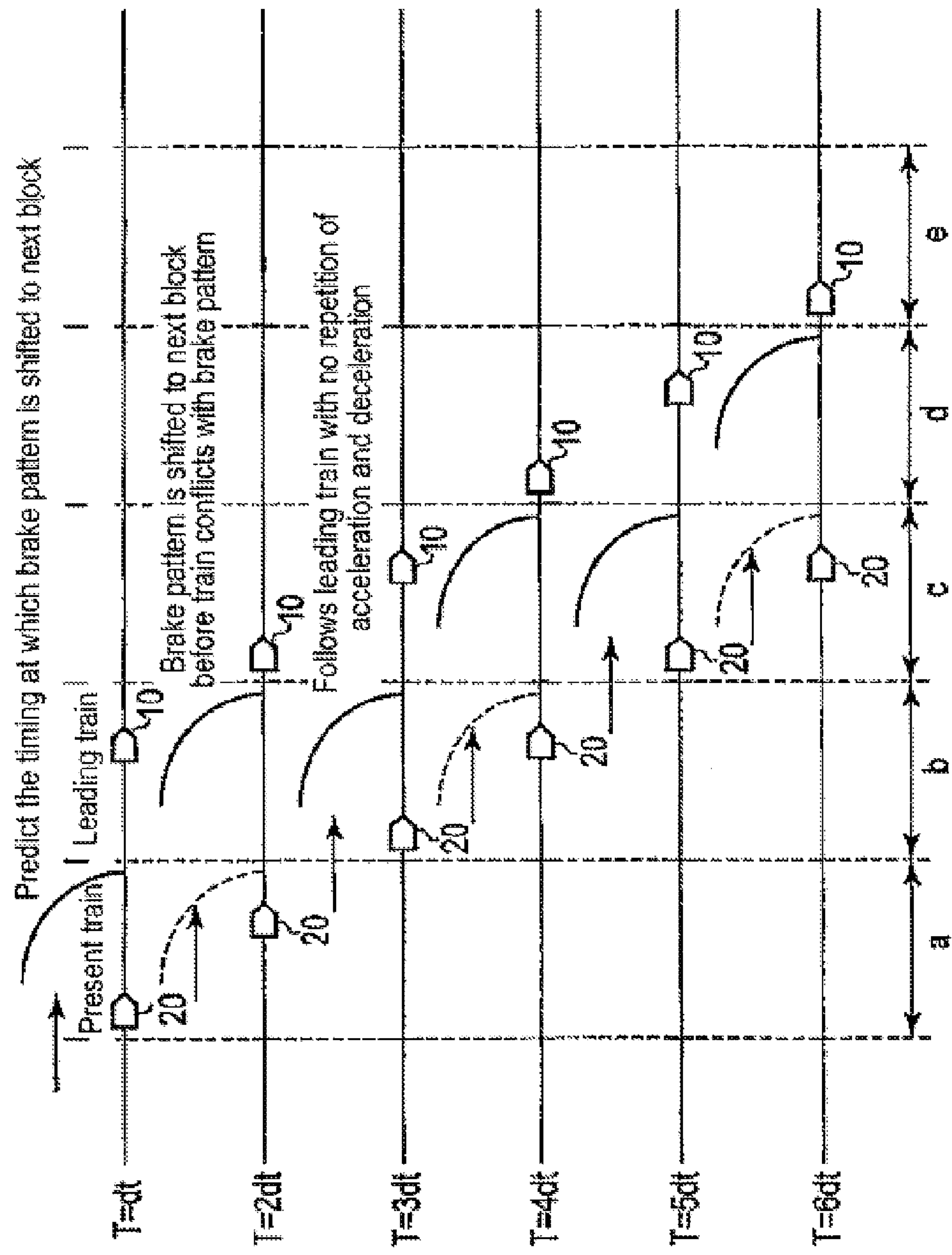
FIG. 2B is another view for explaining the shift of a brake pattern and the adjustment of a travel speed according to the first embodiment.

FIGS. 2A and 2B are views showing the shift of the brake pattern and the travel position relationship of the train A10 and the train B20. FIG. 2A shows, as a comparative example, a case where the target speed calculating unit 203 according to the first embodiment does not calculate the target speed of the train B20 using the travel speed of the train A10. FIG. 2B shows a case where the target speed calculating unit 203 according to the first embodiment performs calculation of the target speed of the train B20 using the travel speed of the train A10.

In FIGS. 2A and 2B, the horizontal axis indicates the travel position of the train A10 and the train B20 with the vertical axis indicating the travel speed of the train A10 and the train B20. FIGS. 2A and 2B show the time-dependent changes in the travel position of the train A10 and the train B20. At time T=dt as shown in FIG. 2A, the train B20 runs in the block a and the train A10 runs in the block b. The train B20 conflicts with the brake pattern having a starting point coinciding with the end point of the block a, because the train A10 is still within the block b. Therefore, the ATC 202 applies brake.

At time T=2dt, the train B20 runs in the block b and the train A10 runs in the block c. The target speed calculating unit 203 shifts the brake pattern having a starting point coinciding with the end point of the block a to a brake pattern having a starting point coinciding with the end point of the block b. Along with the shift of the brake pattern, the ATO 205 performs a power running operation to increase the travel speed of the train B20. At time T=3dt, the train B20 runs in the block b and the train A10 runs in the block c. The train B20 conflicts with the brake pattern having a starting point coinciding with the end point of the block b, because the train A10 is still within the block c. Therefore, the ATC 202 applies brake.

Similarly, at time T=4dt, the ATO 205 performs a power running operation to increase the travel speed of the train B20 as the brake pattern having a starting point coinciding with the end point of the block b is shifted to a brake pattern having a starting point coinciding with the end point of the block c. At time T=5dt, the train B20 conflicts with the brake pattern having a starting point coinciding with the end point of the block c, because the train A10 is still within the block d. Therefore, the ATC 202 applies brake. At time T=6dt, the ATO 205 performs a power running operation to increase the travel speed of the train B20 as the brake pattern having a starting point coinciding with the end point of the block c is shifted to a brake pattern having a starting point coinciding with the end point of the block d. In this manner, the train B20 runs with repeated acceleration and deceleration to travel as scheduled.

At time T=dt as shown in FIG. 2B, the train B20 runs in the block a and the train A10 runs in the block b. Therefore, the target speed calculating unit 203 sets a brake pattern having a starting point coinciding with the end point of the block a. The target speed calculating unit 203 predicts the timing at which the train A10 comes into the next block c, namely the timing at which the brake pattern having a starting point coinciding with the end point of the block a is shifted to a brake pattern having a starting point coinciding with the end point of the block b. The train B20 travels at the target speed calculated by the target speed calculating unit 203 pursuant to the shift timing of the brake pattern.

At time T=2dt, the train B20 runs in the block a and the train A10 runs in the block c after passing through the block b. Immediately before the train B20 conflicts with the brake pattern having a starting point coinciding with the end point of the block a, the target speed calculating unit 203 shifts the brake pattern having a starting point coinciding with the end point of the block a to a brake pattern having a starting point coinciding with the end point of the block b. Therefore, the ATC 202 does not apply brake. At time T3dt, the train B20 runs in the block b and the train A10 runs in the block c. Accordingly, the target speed calculating unit 203 sets a brake pattern having a starting point coinciding with the end point of the block b. The train B20 travels at the target speed calculated by the target speed calculating unit 203 pursuant to the shift timing of the brake pattern.

Similarly, at time T=4dt, immediately before the train B20 conflicts with the brake pattern having a starting point coinciding with the end point of the block b, the target speed calculating unit 203 shifts the brake pattern having a starting point coinciding with the end point of the block b to a brake pattern having a starting point coinciding with the end point of the block c. At time T=5dt, the train B20 travels at the target speed calculated by the target speed calculating unit 203 pursuant to the shift timing of the brake pattern having a starting point coinciding with the end point of the block b to the brake pattern having a starting point coinciding with the end point of the block c. At time T=6dt, immediately before the train B20 conflicts with the brake pattern having a starting point coinciding with the end point of the block c, the target speed calculating unit 203 shifts the brake pattern having a starting point coinciding with the end point of the block c to a brake pattern having a starting point coinciding with the end point of the block d. With the first embodiment, it is possible to minimize the delay of time schedule while reducing unnecessary brake application of the ATC 202.

If the train A10 does not run within one travel block extending from a departure to a stop point, the train B20 may run pursuant to the travel plan prepared in advance, at which time there is no need for the target speed calculating unit 203 to calculate the target speed of the train B20 based on the travel speed of the train A10.

Next, description will be made on a modified example of the first embodiment. As set forth above, the target speed calculating unit 203 of the train B20 calculates the travel speed of the train A10 using the change history of the open block number. However, the travel speed of the leading train A10 calculated by the target speed calculating unit 203 is the average travel speed in the block existing just behind the block currently occupied by the train A10. In other words, the target speed calculating unit 203 assumes that the travel speed of the train A10 in the currently running block is equal to the travel speed thereof in the block existing just behind the currently running block. Therefore, even when the train A10 is subjected to a power running operation or applied with brake in the currently running block, the train B20 cannot recognize the change in the speed of the train A10. For example, if the train A10 is decelerated in the currently running block, it is actually necessary for the target speed calculating unit 203 to delay the shift timing of the brake pattern. If the shift timing of the brake pattern is not delayed, it is highly likely that the train B20 conflicts with the brake pattern, thereby causing the ATC 202 to apply brake.

In this regard, the target speed calculating unit 103 of the train A10 (the present train) holds the ID of the block currently occupied by the present train, the block length information corresponding to the ID, and the target speed or travel speed information of the present train. Using the information noted above, the target speed calculating unit 103 predicts the time taken for the train A10 to move from the block occupied by the tail end thereof to the next block. The train wireless communication device 106 transmits the information on the block passing time of the train A10 calculated by the target speed calculating unit 103 to the train wireless communication device 206 of the train B20 through a network. Using the information on the block passing time of the train A10 transmitted from the train A10, the target speed calculating unit 203 of the train B20 more accurately predicts the shift timing of the brake pattern.

More specifically, if it is determined that, before the lapse of the block passing time of the train A10 calculated by the target speed calculating unit 103, the train B20 conflicts with the brake pattern having a starting point coinciding with the end point of the block existing just behind the block currently occupied by the train A10, the target speed calculating unit 203 recalculates the target speed of the train B20. The ATO 205 may adjust the travel speed of the train B20 pursuant to the target speed recalculated by the target speed calculating unit 203. With this modified example, it is therefore possible to prevent the train B20 from conflicting with the brake pattern.

The target speed calculating unit 203 of the train B20 may predict and correct the shift timing of the brake pattern each time when the train wireless communication device 206 periodically acquires the information on the block passing time of the train A10 calculated by the target speed calculating unit 103. This holds true in case where the train A10 is subjected to acceleration. The target speed calculating unit 203 of the train B20 may correct the shift timing of the brake pattern to move forward and may increase the target speed.

With the first embodiment, it is possible to provide a travel speed guideline for making sure that the train can reach the jut prior position of the brake pattern during the time period within which the starting point of the brake pattern moves to the next block. This makes it possible to realize energy saving, enhanced riding comfort and as-scheduled travel. In addition, it is possible to shorten the time interval (or distance) between the running trains within a safety-guaranteed extent, which in turn makes it possible to realize a time schedule having a reduced train interval. In case of a manual operation, the driver may drive a train pursuant to the target speed. With the first embodiment, it is therefore possible to reduce the variations of train operation attributable to the difference in the talent of the individual drivers.

Next, description will be made on a second embodiment. The system including a plurality of trains each provided with a train control device according to a second embodiment and a track circuit is the same as the system of the first embodiment as shown in FIG. 1 and therefore will not be described in detail. In the second embodiment, a travel plan is calculated to ensure that the time required for the train A10 to travel between stations can conform to the time schedule. The second embodiment is directed to a system for a long-distance high-speed railroad and is based on the premise that a train travels at a constant speed for a long period of time. The travel of the train B20 will be described herein.

Figure 3:
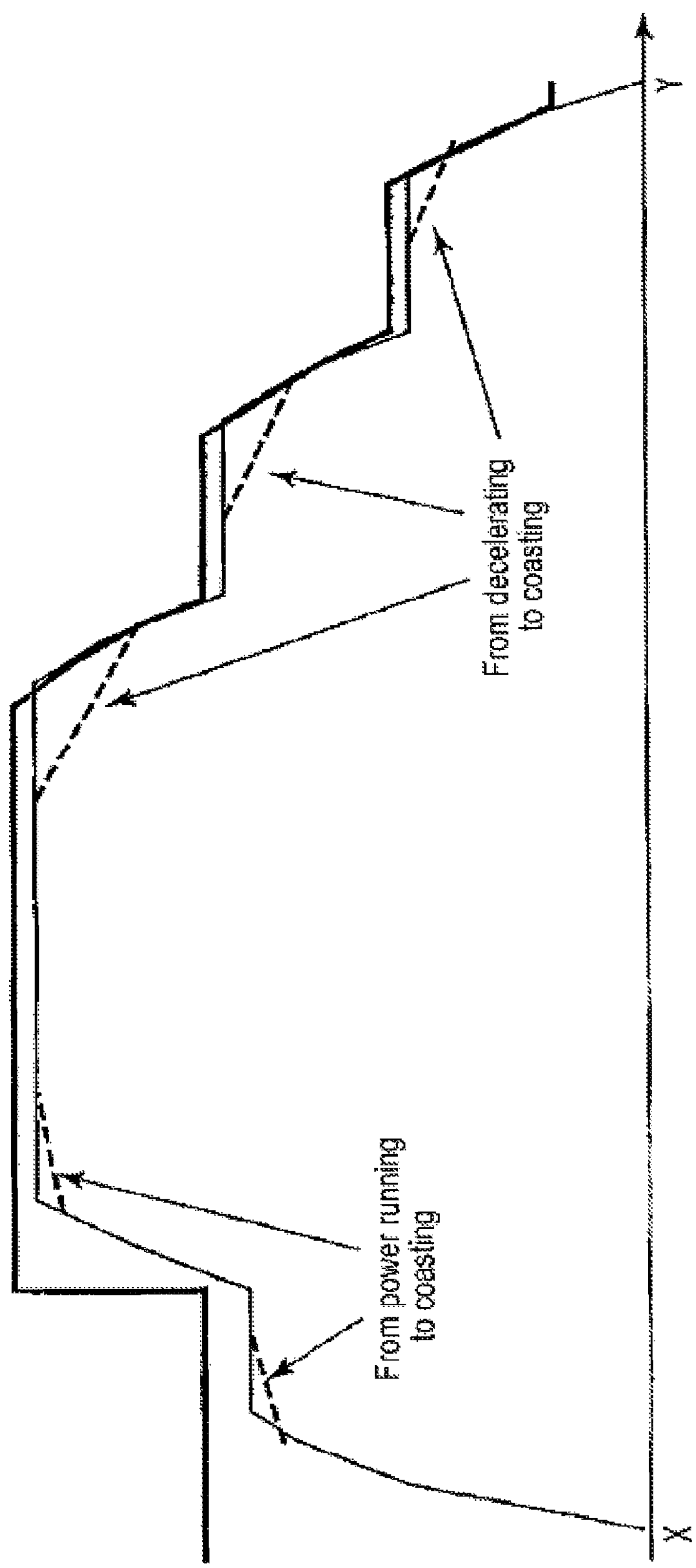
FIG. 3 is a view showing a travel speed change when a train travels along a block between a station X and a station Y according to a second embodiment.

FIG. 3 shows a change in the target speed in case where the distance between stations is relatively short and the specified travel time between stations is set relatively short as in the railroad existing in, e.g., the suburbs of cities, and in case where the train B20 travels along the block extending from a station X to a station Y pursuant to the travel plan calculated by the target speed calculating unit 203 of the second embodiment.

In FIG. 3, the horizontal axis indicates the position while the vertical axis indicates the target speed. The thick line signifies the threshold value of a limited speed. The thin line denotes the travel plan calculated by the target speed calculating unit 203 using the threshold value and the travel time in the X-Y section. In this regard, the target speed calculating unit 203 holds geographical information such as the gradient in the X-Y section. The target speed calculating unit 203 calculates the air resistance information. If the simulation of the train speed change during a coasting operation conducted pursuant to the geographical information and the air resistance information reveals that the coasting travel speed in a downhill railroad can be increased without causing any delay in the travel time in the X-Y section, the target speed calculating unit 203 replaces the power running parts in the travel plan as shown in FIG. 3 with the coasting parts as indicated by broken lines. Similarly, the target speed calculating unit 203 replaces the decelerating parts in the travel plan as shown in FIG. 3 with the coasting parts as indicated by broken lines so that the end parts of the constant speed running sections can be replaced with the coasting parts to perform deceleration in a gentle manner. The target speed calculating unit 203 transmits the recalculated travel plan, in which the end parts of the power running and constant speed running sections are changed to coasting parts, to the ATO 205. The ATO 205 automatically operates the train B20 pursuant to the recalculated travel plan. It is often the case that the train B20 cannot travel as scheduled due to the external factors such as the weather, the occupancy rate and the manual operation. For the above reason, the target speed calculating unit 203 adjusts the travel plan several times in the X-Y section. With the second embodiment, the partial coasting travel of the train B20 leads to increased energy saving. While the configuration for replacing the end parts of the power running and constant speed running sections with the coasting parts has been described above, description will now be made on how to change the target speed in the constant speed running sections.

Figure 4:
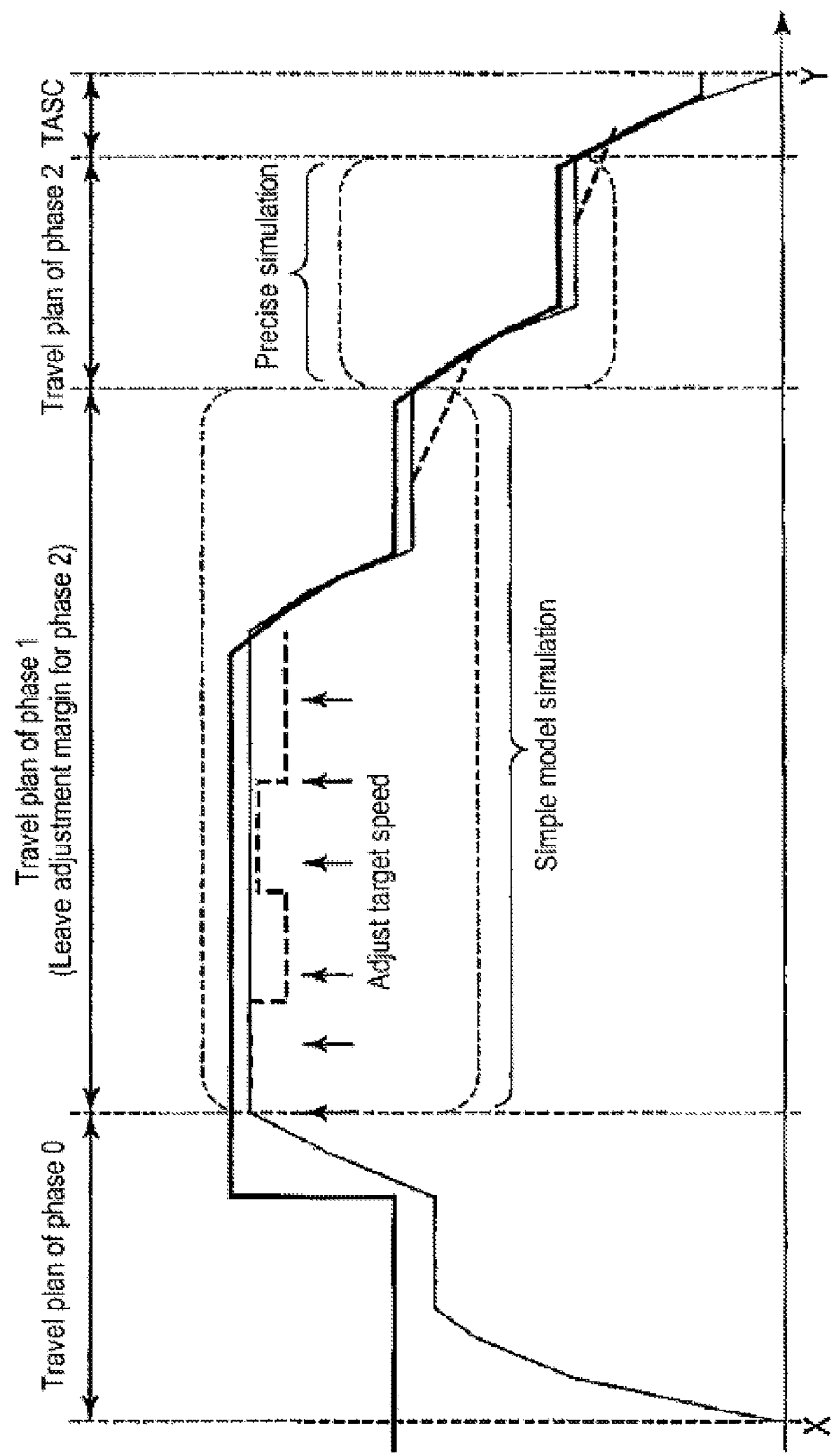
FIG. 4 is another view showing a travel speed change when a train travels along a block between a station X and a station Y according to the second embodiment.

FIG. 4 shows a change in the target speed in case where the distance between stations is relatively long and the specified travel time between stations is set relatively long as in, e.g., the inter-city railroad, and in case where the train B20 travels along the section extending from a station X to a station Y pursuant to the travel plan calculated by the target speed calculating unit 203 of the second embodiment. In FIG. 4, the horizontal axis indicates the position while the vertical axis indicates the target speed. The thick line signifies the threshold value of a limited speed. The thin line denotes the travel plan calculated by the target speed calculating unit 203 using the threshold value and the travel time in the X-Y section. In the following description, the section where the travel plan is not available will be referred to as phase 0, the section distant from the next station where the travel plan is available will be referred to as phase 1, and the section close to the next station will be referred to as phase 2. As will be described below, the target speed calculating unit 203 properly adjusts the travel plan in phase 1 through simple calculation and adjusts the travel plan in phase 2 through precise simulative calculation.

Figure 5:
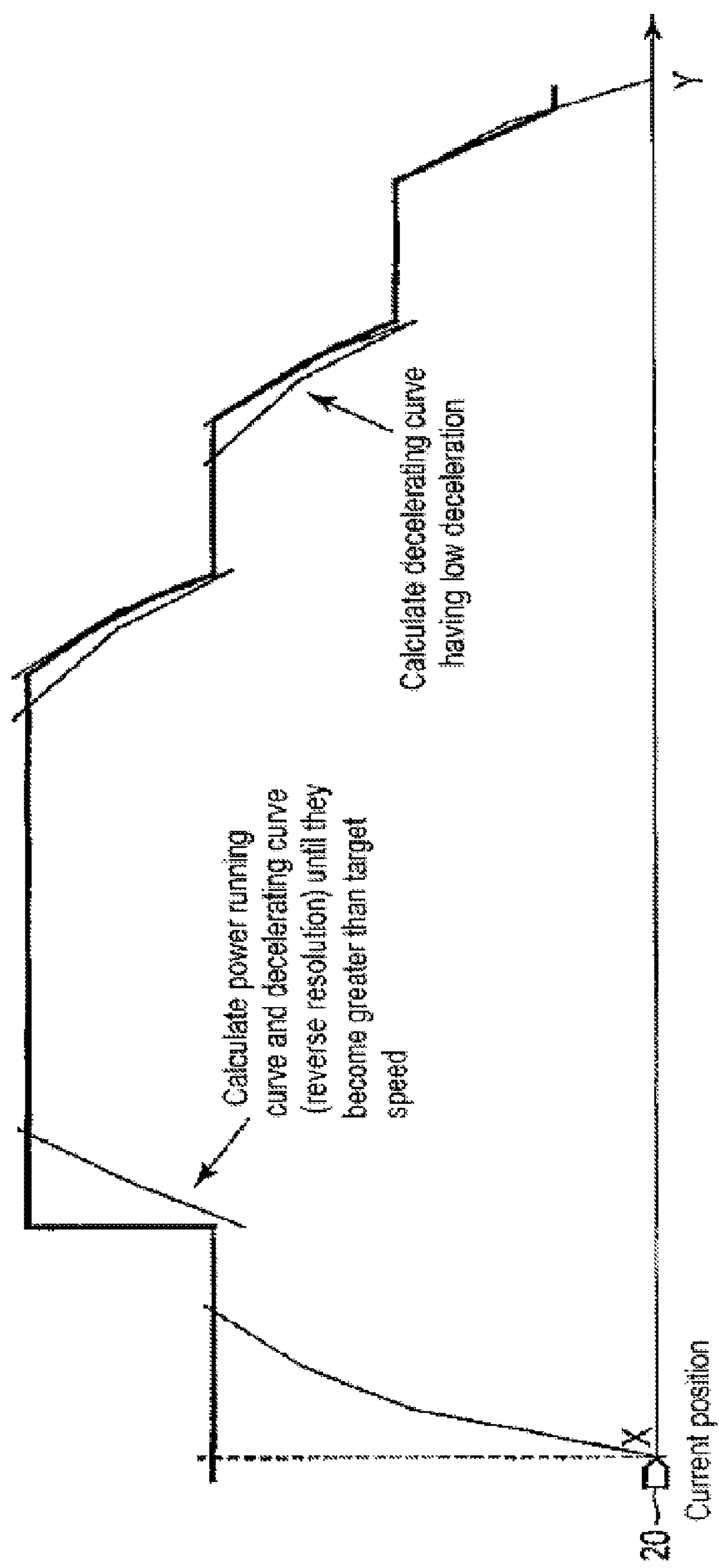
FIG. 5 is a view showing a power running curve and a deceleration curve calculated for a travel plan of phase 0 according to the second embodiment.
Figure 6:
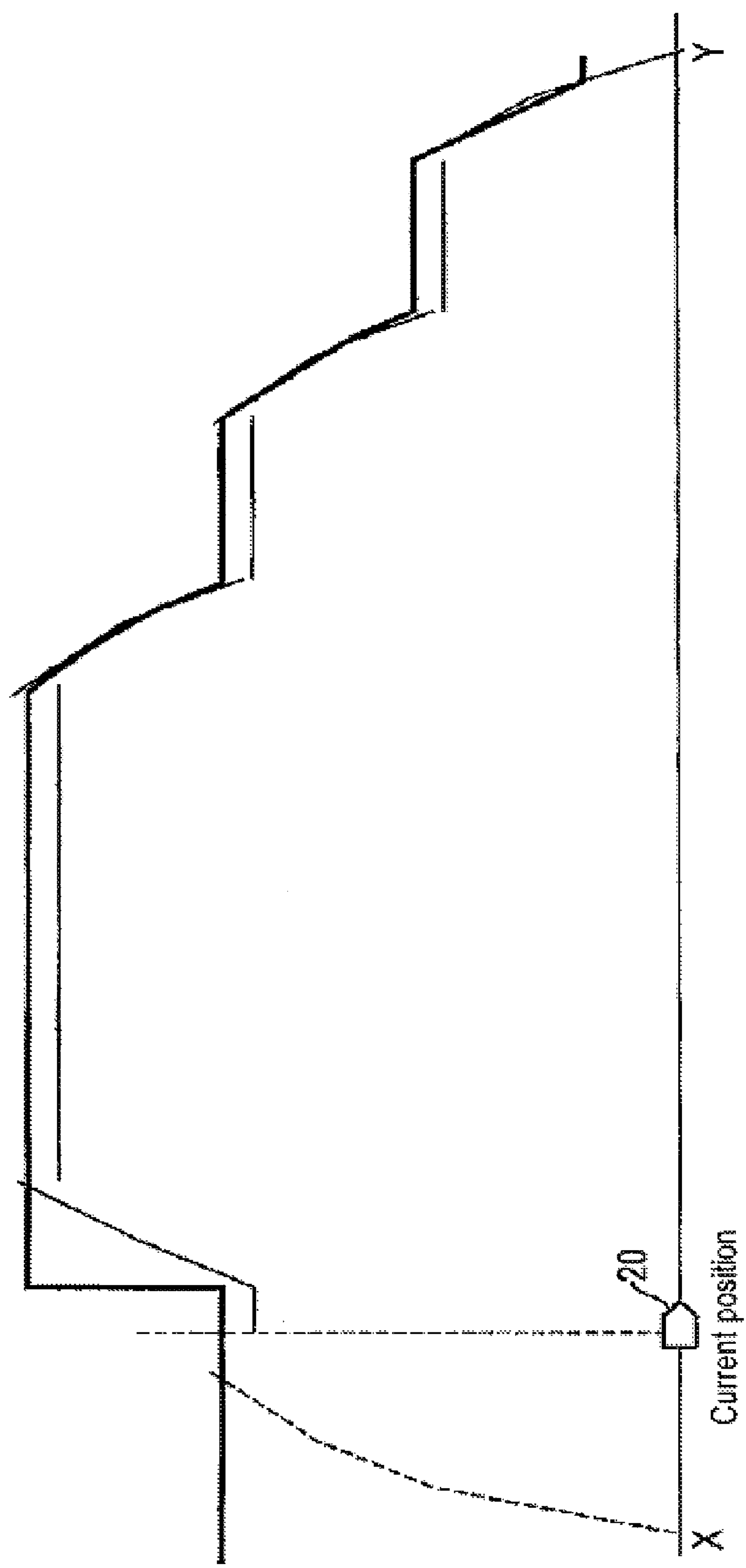
FIG. 6 is a view showing the travel plan of phase 0 according to the second embodiment.

First, description will be made on the calculation of the travel plan in phase 0. FIG. 5 shows a power running curve and a decelerating curve for the travel plan calculated by the target speed calculating unit 203 of the second embodiment. On off-line, before departure or immediately after departure, the target speed calculating unit 203 calculates, through a simulation conducted in a unit of, e.g., one or two seconds, power running curves in the departure position and in the limited speed increasing part, decelerating curves in the limited speed decreasing part and in the next station and a decelerating curve in the stop part of the station Y, until the power running curves and the decelerating curves become greater than the target speed. The target speed calculating unit 203 calculates the decelerating curves through reverse resolution using, e.g., the decelerating pattern of the ATC 202. The target speed calculating unit 203 also calculates a decelerating curve in which the deceleration is smaller than the ATC 202 by, e.g., one notch step. The target speed calculating unit 203 calculates a travel plan by linking the power running curves and the decelerating curves with straight lines indicating a speed smaller than the limited speed by an allowable value. FIG. 6 shows the travel plan calculated by the target speed calculating unit 203. Shown in FIG. 6 is a state that the train B20 runs in a position where the distance to the next station remains long. The target speed calculating unit 203 calculates, as a target speed, the speed smaller than the limited speed by an allowable value while calculating the travel plan. The ATO 205 starts an automatic operation pursuant to the target speed thus calculated.

Figure 7:
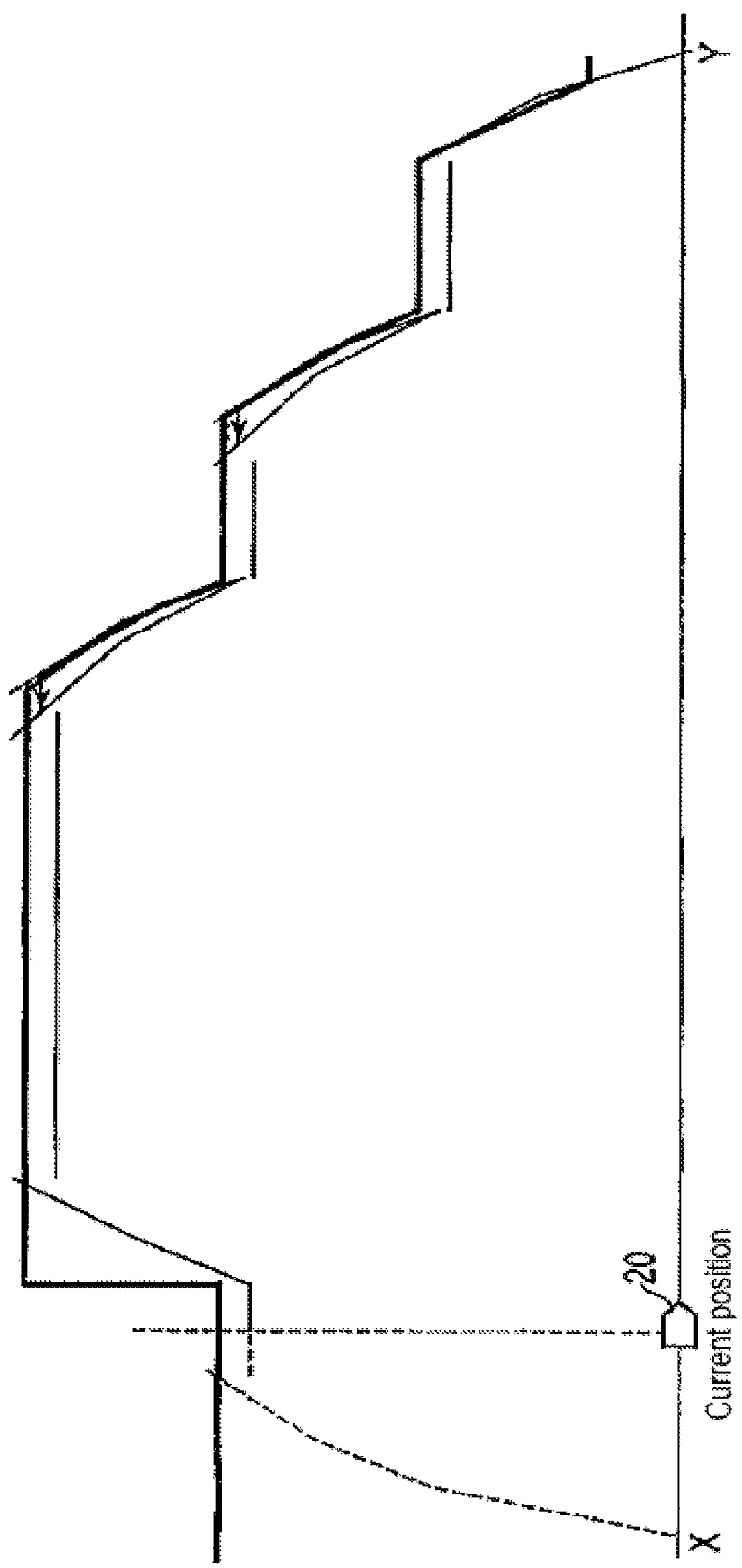
FIG. 7 is a view showing the change of the deceleration curve in phase 1 according to the second embodiment.

Next, description will be made on the adjustment of the travel plan of phase 1 performed by the target speed calculating unit 203. FIG. 7 shows the travel plan of phase 1 adjusted by the target speed calculating unit 203. The travel plan as shown in FIG. 7 is obtained by changing the decelerating curves of the travel plan as shown in FIG. 6 in case where there remains a travel time to spare. Shown in FIG. 7 is a state that the train B20 runs in a position where the distance to the next station remains long. A case that there remains a travel time to spare means that the following equation is satisfied: target travel time determined by time schedule−(predicted value of travel time taken until arrival in station Y+time lapsed from departure of station X to now)>adjustment margin for phase 2 . . . (1). In this regard, the term “adjustment margin” means a specified time range in which the time can be adjusted to ensure that the train B20 can reach the station Y as scheduled when the train B20 is expected to arrive at the station Y earlier than or later than the target travel time determined by the time schedule. A case that the travel time to spare is greater than the adjustment margin for phase 2 means that, even when the adjustment margin is utilized to the greatest possible extent, the train B20 is expected to arrive at the station Y earlier than the target travel time determined by the time schedule if the train B20 travels pursuant to the current travel plan. Accordingly, it is necessary for the target speed calculating unit 203 to recalculate the travel plan in order to adjust the travel time to the station Y.

The target speed calculating unit 203 replaces the same decelerating parts with the decelerating curve having a one-step low deceleration among the decelerating curves calculated in phase 0. The target speed calculating unit 203 adjusts the decelerating curves in the order nearer to the station Y as a target stop position. As the decelerating parts are replaced with the decelerating curve having a low deceleration, the target speed calculating unit 203 shortens the constant speed running section associated with the decelerating curve. Since all that is required is to merely select the decelerating curves calculated in advance, there is no need to recalculate decelerating curves. This makes it possible to reduce the processing load.

Figure 8A:
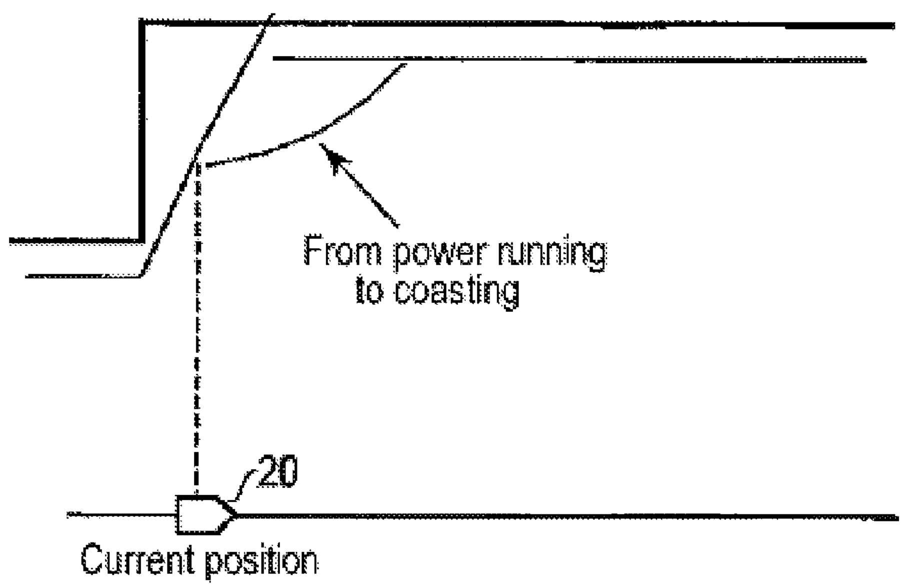
FIG. 8A is a view showing the change from a power running operation to a coasting operation in phase 1 according to the second embodiment.
Figure 8B:
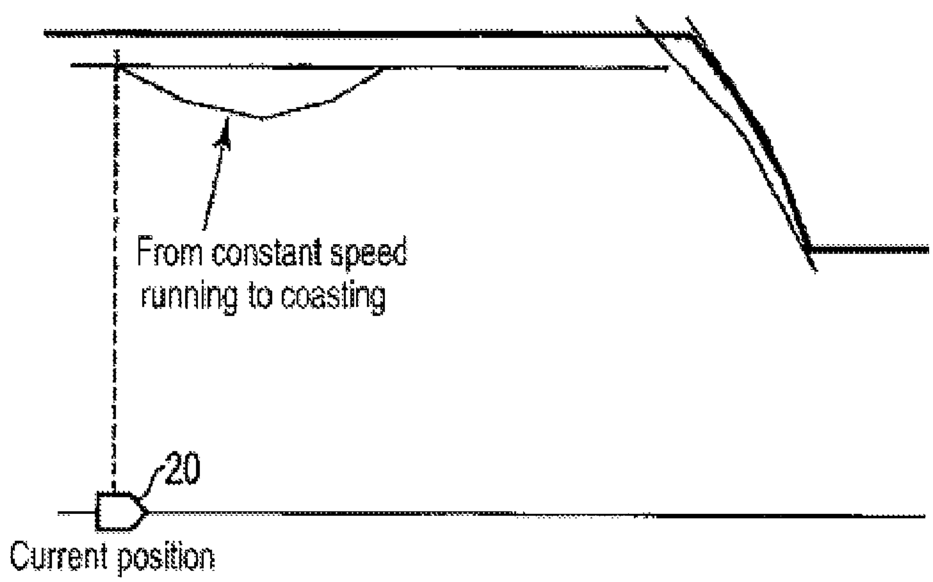
FIG. 8B is another view showing the change from the power running operation to the coasting operation in phase 1 according to the second embodiment.

FIGS. 8A and 8B are views showing the travel plans of phase 1 adjusted by the target speed calculating unit 203. The travel plans as shown in FIGS. 8A and 8B are obtained by changing the power running parts or the constant speed running sections of the travel plan as shown in FIG. 7 to the coasting curves in case where there remains a travel time to spare. Shown in FIGS. 8A and 8B is a state that the train B20 runs in a position where the distance to the next station remains long. If it is determined that the equation (1) can be satisfied by the travel plan available after replacing the decelerating curves with the one having a low acceleration, then the target speed calculating unit 203 readjusts the travel plan of phase 1. The target speed calculating unit 203 adjusts the travel plan in the following manner so that the power running parts or the constant speed running sections can be changed to the coasting curves. The target speed calculating unit 203 conducts a short-time coasting simulation based on the current position and the current travel speed. In case where the travel speed of the train B20 reaches the travel speed of the pre-correction travel plan before the end of the simulation, the target speed calculating unit 203 adjusts the travel plan so that the power running parts or the constant speed running sections can be changed to the coasting curves, if it is determined that a coasting time equal to or greater than a specified time can be secured and that the equation (1) can be satisfied despite the increase of the travel time of phase 1.

Although geographical conditions, such as gradient, and air resistance need to be taken into account for the coasting simulation, such consideration may be omitted in order to finish the simulation within a short period of time without increasing the processing load.

Figure 9:
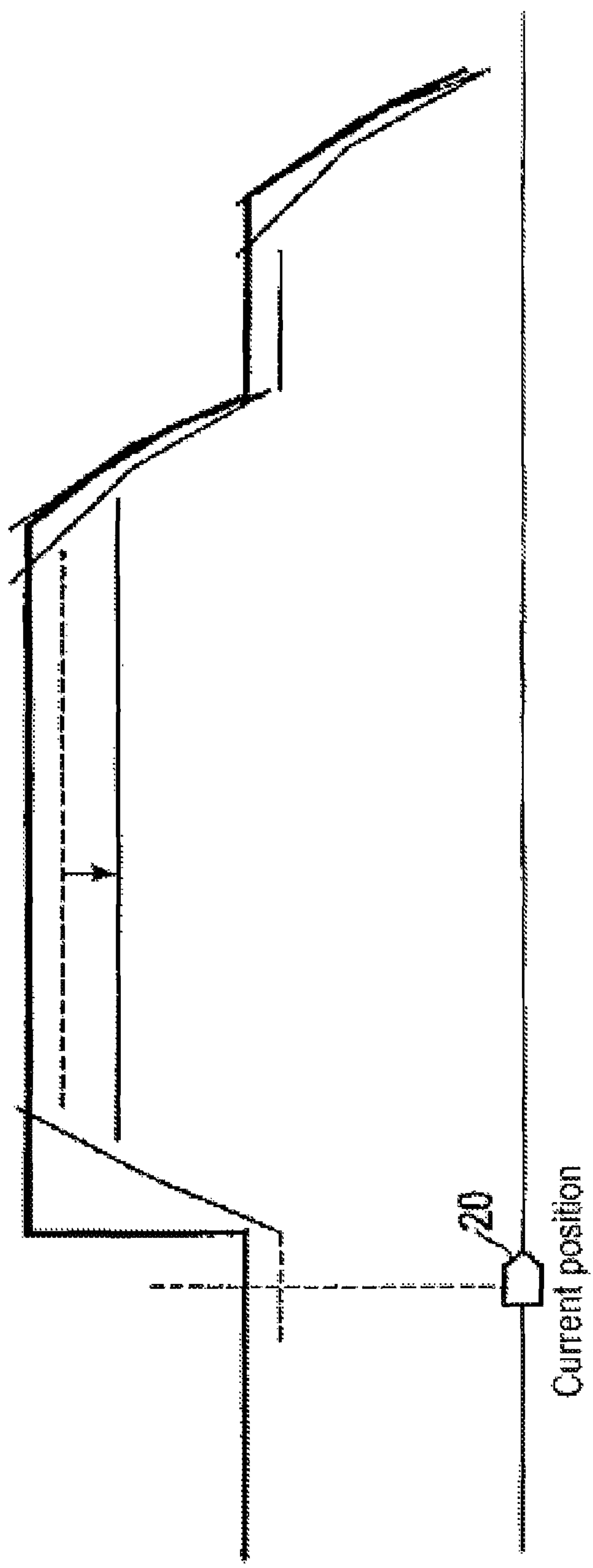
FIG. 9 is a view showing the change of a constant speed in phase 1 according to the second embodiment.

FIG. 9 shows the travel plan of phase 1 adjusted by the target speed calculating unit 203. The travel plan as shown in FIG. 9 is obtained by changing the target speed of the travel plan as shown in FIG. 7. Shown in FIG. 9 is a state that the train B20 runs in a position where the distance to the next station remains long. If it is determined that the equation (1) can be satisfied by the travel plan available after replacing the decelerating curves with the one having a low acceleration, then the target speed calculating unit 203 readjusts the travel plan of phase 1. The target speed calculating unit 203 adjusts the travel plan in the following manner so that the target speed in the constant speed running sections can be reduced. The target speed calculating unit 203 performs the same adjustment regardless of whether or not the power running parts or the constant speed running sections are changed to the coasting curves as shown in FIGS. 8A and 8B.

The target speed calculating unit 203 reduces the constant speed starting from the constant speed running section having a longer time span among the constant speed running sections interposed between the power running curves and the decelerating curves. If the target speed is lower than the current travel speed, the ATO 205 performs adjustments so that the current travel speed can be reduced to the target speed. When performing adjustments to increase or reduce the target speed in the constant speed running sections, it is not necessary for the target speed calculating unit 203 to consider geographical conditions, such as gradient, and air resistance in the constant speed running sections. This makes it possible to reduce the processing load.

Figure 10:
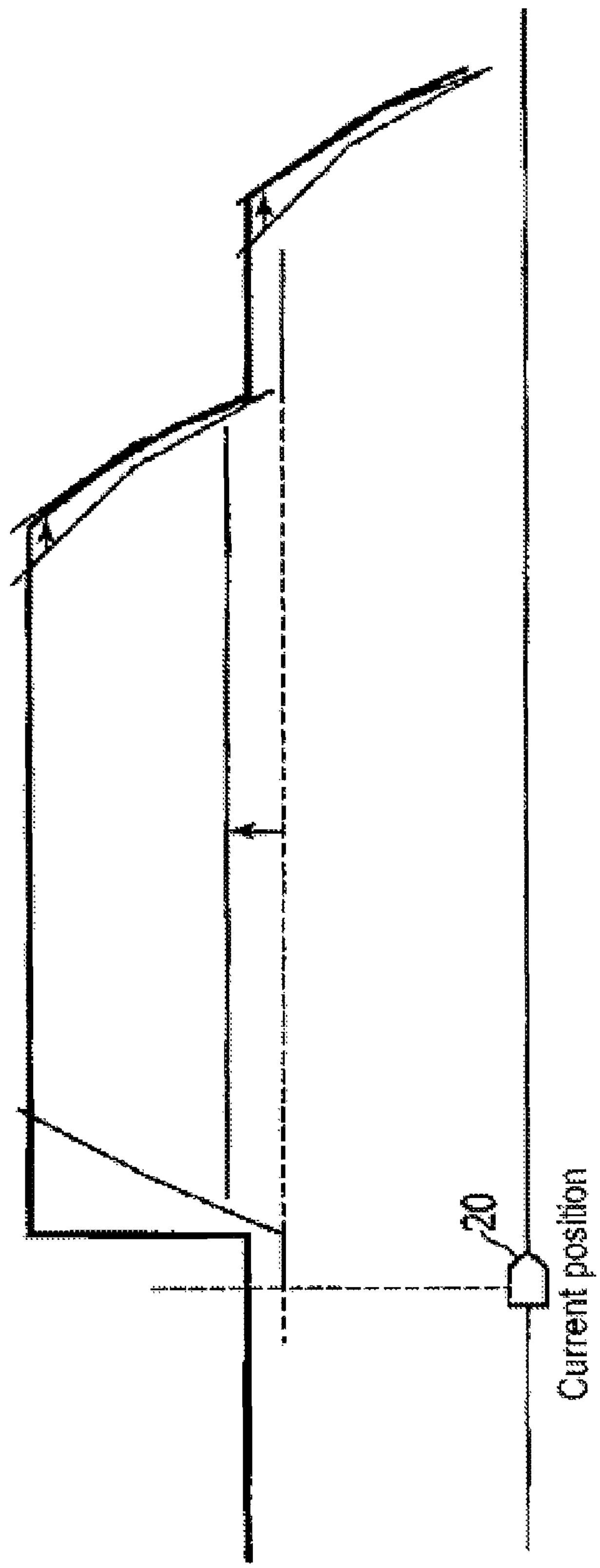
FIG. 10 is a view showing another example of the change of the constant speed in phase 1 according to the second embodiment.

FIG. 10 shows the travel plan of phase 1 adjusted by the target speed calculating unit 203. The travel plan as shown in FIG. 10 is obtained by readjusting the target speed adjusted in FIG. 9. Shown in FIG. 10 is a state that the train B20 runs in a position where the distance to the next station remains long. If it is determined that the equation (1) is not satisfied, then the target speed calculating unit 203 readjusts the travel plan of phase 1. In this case, with a view to adjust the travel time to the station Y, it is necessary for the target speed calculating unit 203 to recalculate the travel plan so that the train A10 can rapidly pass through the sections of phase 1. First, the target speed calculating unit 203 increases the constant speed of the constant speed running section nearest from the current position among the constant speed running sections adjusted to have a constant speed lower than the target speed determined by the limited speed. Then, if there exists no constant speed running section whose target speed is to be increased or if the equation (1) cannot be satisfied by increasing the target speed, the target speed calculating unit 203 replaces the decelerating curve associated with the constant speed running section nearest from the current position with the decelerating curve having a high deceleration. When performing adjustment to increase or reduce the target speed in the constant speed running sections, it is not necessary for the target speed calculating unit 203 to consider geographical conditions, such as gradient, and air resistance in the constant speed running sections. Since all that is required when changing the deceleration of the decelerating curve of the travel plan is to merely select the decelerating curves calculated in advance, it is possible to reduce the processing load.

While the adjustment of the travel plan in phase 1 has been described above with reference to FIGS. 7 through 10, the replacement of the decelerating curve in the travel plan, the change from the power running or the constant speed running to the coasting and the change of the target speed may be performed in an arbitrary order and in an arbitrary combination.

Figure 11:
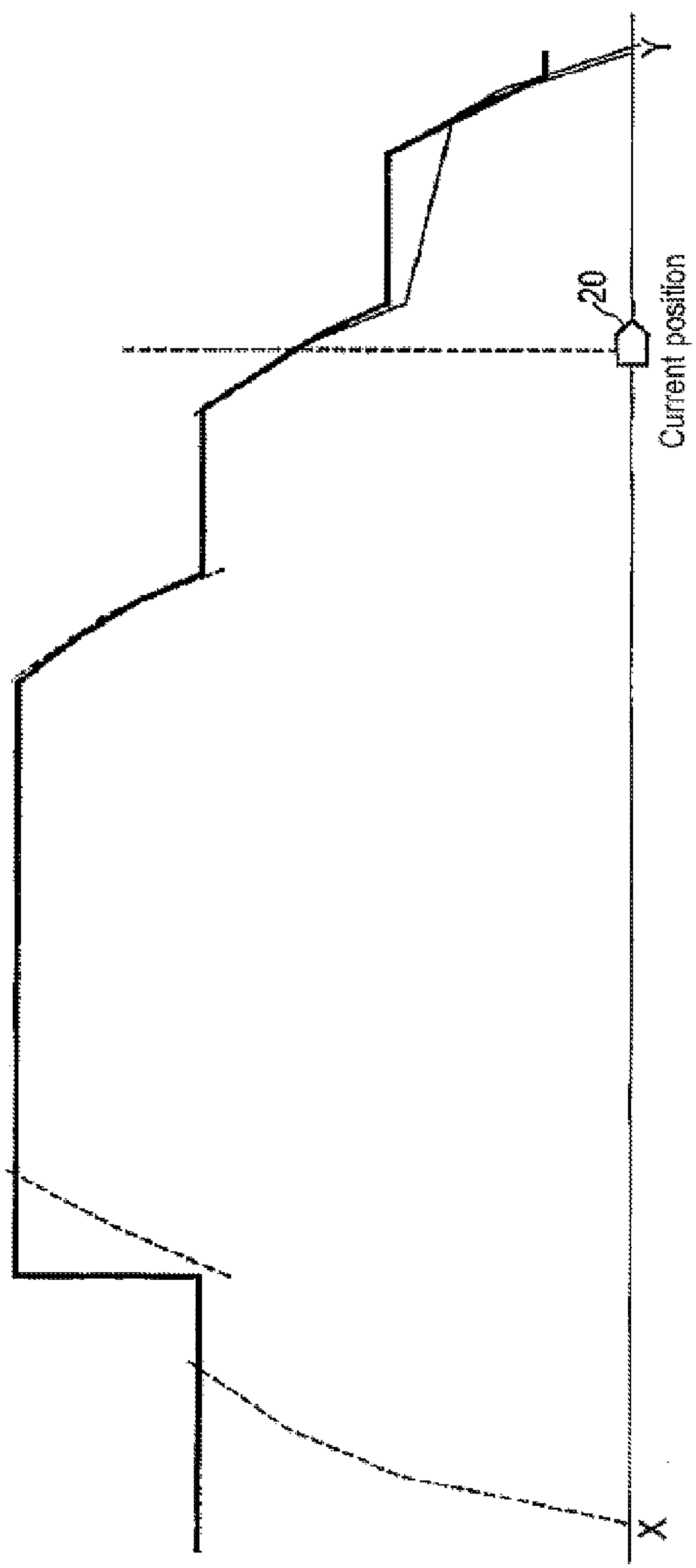
FIG. 11 is a view showing the change from a decelerating operation to a coasting operation in phase 1 according to the second embodiment.

FIG. 11 shows the travel plan of phase 2 adjusted by the target speed calculating unit 203. The travel plan as shown in FIG. 11 is obtained by changing the constant speed running sections or the decelerating parts of the travel plan as shown in FIG. 6 to the coasting curves in case where there remains a travel time to spare. The target speed calculating unit 203 predicts the required time pursuant to the distance from the current position to the target stop position and in view of geographical conditions, such as gradient, and air resistance. Just like the adjustment of the travel plan in the short-distance section, the target speed calculating unit 203 adjusts the travel plan so that the train B20 can arrive at the station Y, i.e., the target stop position, as scheduled. In other words, the target speed calculating unit 203 replaces the constant speed running sections or the decelerating parts of the travel plan with the coasting curves in view of the geographical conditions and the air resistance.

With the second embodiment, it is possible to provide a travel speed guideline based on simple calculation, according to which the as-scheduled travel can be realized by mainly changing the target speed in the constant speed running section. This makes it possible to realize energy saving, enhanced riding comfort and as-scheduled travel even on a railroad between long-distance long-time stations without increasing the processing load. In case of a manual operation, the driver may drive a train pursuant to the target speed in the constant speed running section. With the first embodiment, it is therefore possible to reduce the variations of train operation attributable to the difference in the talent of the individual drivers.

Next, description will be made on a third embodiment. The system including a plurality of trains each provided with a train control device according to a third embodiment and a track circuit is the same as the system of the first embodiment as shown in FIG. 1 and therefore will not be described in detail. The travel of the train B20 will be described herein.

As described above with respect to the first embodiment, the target speed calculating unit 203 calculates a target speed for ensuring that train B20 can travel to the position where the train B20 is immediately before conflicting with the brake pattern having a starting point coinciding with the end point of the block existing just behind the block currently occupied by the train A10. This target speed is referred to as a first target speed. If it is determined that the travel time of the travel plan taken from the current position to the stop position is shorter than or longer than a predetermined travel time by a specified value or more, the target speed calculating unit 203 calculates a target speed by increasing or decreasing the speed of the travel plan in the manner described above in connection with the second embodiment. This target speed is referred to as a second target speed. In case where a travel plan is not available, the target speed calculating unit 203 calculates, as a target speed, the speed obtained by subtracting a specified speed value from the predetermined limited speed in the travel section. The reason for subtracting the specified speed value is to ensure that the target speed has an allowance with respect to the limited speed. This target speed is referred to as a third target speed.

The target speed calculating unit 203 sets the slowest one of the first, second and third target speeds as a target speed of the train B20. The ATO 205 automatically operates the train B20 by controlling the travel speed of the train B20 pursuant to the target speed thus set. With the third embodiment, it is possible to reduce unnecessary brake application performed by the ATC 202 and to realize energy saving, enhanced riding comfort, as-scheduled travel and safe travel not exceeding the limited speed even on a railroad between long-distance long-time stations without increasing the processing load.

While certain embodiments of the present disclosure have been described above, these embodiments are presented by way of example and are not intended to limit the scope of the present disclosure. These embodiments can be modified in many different forms. Various kinds of omission, substitution and modification may be made without departing from the scope and spirit of the present disclosure. These embodiments and the modifications thereof fall within the scope and spirit of the present disclosure and are included in the scope of the present disclosure recited in the claims and the equivalent thereof.

What is claimed is:

1. A method comprising:

receiving by a signal receiving unit location identification blocks for a first train and a second train, the first train located in front of the second train;

determining by a track circuit the number of blocks that are open between the first and second train;

determining by a target speed calculating unit a brake pattern for the second train based on the location identifications and the number of open blocks;

determining by the target speed calculating unit an average speed of the first train;

predicting by the target speed calculating unit a time when the first train will pass the next block based on the location and average speed of the first train;

determining by the target speed calculating unit a target speed for the second train based on the predicted time the first train will pass the next block and the brake pattern; and wherein the determined average speed of the leading train based on the time taken for the leading train to come out from the block existing just behind the block occupied by the leading train and distance information of the block existing just behind the block occupied by the leading train, and predicted time when the first train will pass the next block is based on the travel speed of the leading train and distance information of the block occupied by the leading train.

2. The method of claim 1, further comprising:
outputting the target speed so that the target speed is displayed on a display device.

3. The method of claim 1, further comprising:
acquiring, from the leading train, the time taken for the leading train to come out from the block occupied by the leading train, and recalculating the target speed based on the information acquired.

4. The method of claim 1 further comprising setting a travel plan from a departure position to a target stop position.

5. The method of claim 4 further comprising calculating a travel time to be taken from a current position to the target stop position based on the travel plan.

6. The method of claim 5 further comprising adjusting the travel time of the travel plan if it is determined that the travel time is shorter than or longer than a predetermined time by a specified value or more.

7. A train control device, comprising:
a first acquisition device operable to acquire a change history of open block numbers as the number of blocks existing between a present train and a leading train;
a setting device operable to set a brake pattern having a starting point coinciding with an end point of a block existing just behind a block occupied by the leading train;
a calculating device operable to calculate a time taken for the leading train to come out from the block existing just behind the block occupied by the leading train and for calculating, as a target speed, the highest speed available within a range not conflicting with the brake pattern; and
wherein the calculating device calculates a travel speed of the leading train based on the time taken for the leading train to come out from the block existing just behind the block occupied by the leading train and the distance information of the block existing just behind the block occupied by the leading train, and calculates the time at which the leading train comes out from the block occupied by the leading train, based on the travel speed of the leading train and the distance information of the block occupied by the leading train.

8. The device of claim 7, further comprising:
an output device operable to output the target speed calculated by the calculating device so that the target speed is displayed on a display device.

9. The device of claim 7, further comprising:
a second acquisition device operable to acquire, from the leading train, the time taken for the leading train to come out from the block occupied by the leading train, the calculating device recalculating the target speed based on the information acquired by the second acquisition device.

10. The device of claim 7, wherein the setting device is further operable to set a travel plan from a departure position to a target stop position; the calculating device is further operable to calculate a travel time to be taken from a current position to the target stop position based on the travel plan; and further comprising an adjusting device for adjusting the travel time of the travel plan if it is determined that the travel time is shorter than or longer than a predetermined time by a specified value or more.

11. A train control device, comprising:
a setting device for setting a travel plan from a departure position to a target stop position;
a calculating device for calculating a travel time to be taken from a current position to the target stop position based on the travel plan;
an adjusting device for adjusting the travel time of the travel plan if it is determined that the travel time is shorter than or longer than a predetermined time by a specified value or more;
wherein the adjusting device adjusts a travel speed in a constant speed running section to become greater than or smaller than a speed set by the travel plan; and
wherein the adjusting device replaces the constant speed running section of the travel plan with a coasting operation based on a short-time prediction result of a behavior available when a train coasts from the current position.

12. The device of claim 11, wherein the adjusting device adjusts a deceleration of an end part of the constant speed running section to become greater than or smaller than a deceleration of a decelerating curve set by the travel plan.

13. The device of claim 11, wherein, after a present train position comes close to the target stop position, the adjusting device adjusts the travel plan by performing simulative calculation in which an air resistance and a geographical condition are taken into account.

* * * * *